US007466092B2

(12) United States Patent
Prudham

(10) Patent No.: US 7,466,092 B2
(45) Date of Patent: Dec. 16, 2008

(54) POLYPHASE MOTOR

(75) Inventor: Daniel Prudham, Thise (FR)

(73) Assignee: Societe Industrielle de Soncebox, S.A., Sonceboz (CH)

(*) Notice: Subject to any disclaimer, the term of this patent is extended or adjusted under 35 U.S.C. 154(b) by 557 days.

(21) Appl. No.: 10/483,794

(22) PCT Filed: Jul. 12, 2002

(86) PCT No.: PCT/FR02/02503

§ 371 (c)(1),
(2), (4) Date: Jan. 14, 2004

(87) PCT Pub. No.: WO03/009453

PCT Pub. Date: Jan. 30, 2003

(65) Prior Publication Data

US 2005/0073270 A1 Apr. 7, 2005

(30) Foreign Application Priority Data

Jul. 18, 2001 (FR) .................................. 01 09601

(51) Int. Cl.
*H02P 6/00* (2006.01)

(52) U.S. Cl. ........................... 318/400.01; 318/400.42; 318/400.38

(58) Field of Classification Search ............ 318/400.38
See application file for complete search history.

(56) References Cited

U.S. PATENT DOCUMENTS

| | | | | |
|---|---|---|---|---|
| 4,858,044 | A * | 8/1989 | Crapo | 360/99.08 |
| 4,905,110 | A * | 2/1990 | Krum et al. | 360/99.08 |
| 5,880,551 | A * | 3/1999 | Prudham | 310/254 |
| 5,909,072 | A | 6/1999 | Muller | |
| 6,034,499 | A * | 3/2000 | Tranovich | 318/650 |
| 6,104,152 | A * | 8/2000 | Coles et al. | 318/254 |
| 2001/0051098 | A1* | 12/2001 | Kenney et al. | 417/410.1 |

* cited by examiner

*Primary Examiner*—Walter Benson
*Assistant Examiner*—Renata McCloud
(74) *Attorney, Agent, or Firm*—Egbert Law Offices

(57) ABSTRACT

A multiphase motor includes a fixed part or stator energized by electric coils and a mobile part or rotor including N pairs of poles radially magnetized in alternate directions, N being not less than 4 while being other than a multiple of 3, and the stator including P×9 identical poles spaced apart by 40°/P, the stator poles being assembled consecutively by three so as to define a phase with a W-shaped circuit, assembling three consecutive stator poles, the central stator pole bearing the winding of the phase. At least one element for detecting the position of the rotor is arranged in a common stage with the stator poles, in a housing substantially equidistant between two consecutive stator poles not belonging to a common phase.

7 Claims, 1 Drawing Sheet

POLYPHASE MOTOR

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The invention relates to a multiphase motor consisting, on the one hand, of a fixed part or stator energized by electric coils and, on the other hand, a mobile part or rotor including N pairs of poles radially magnetized in alternate directions, N being higher than or equal to 4 while being other than a multiple of 3, and said stator including P×9 identical poles spaced apart by 40°/P, said stator poles being assembled consecutively three by three so as to define a phase consisting of a W-shaped circuit, assembling three consecutive stator poles, the central stator pole bearing the winding of said phase.

This invention relates in general to the field of electric polyphase motors. In particular, it relates to small-size motors, such as those ensuring the driving of valves, for example air-inlet valves, on motor vehicles or the like, and consequently using rotor-position detection elements.

BACKGROUND OF THE INVENTION

Such motors are for example described in FR-2 754 953. Thus, reference is made in particular to a polyphase motor consisting, on the one hand, of a fixed part or stator, energized by electric coils and, on the other hand, a magnetized mobile part or rotor. The latter includes N1 pairs of poles radially magnetized in alternate directions, N1 being equal to 4 or 5. As to the stator, it includes N2 identical poles, N2 being equal to 9 so that these poles are spaced apart by 40°. Besides, they are assembled consecutively 3 by 3 so that each phase consist of a W-shaped circuit, grouping three consecutive stator poles. The central pole of the W bears the winding of said phase. Besides, the central poles of two W-shaped circuits are angularly spaced apart by 120°.

These elements are arranged in a common stage, that is substantially in the game plane, in order to optimize costs and size of the parts they are comprised of, such as the magnets.

For this type of motor, it is usual to detect the displacement of the mobile rotor part in the magnetic circuit. In fact, this rotor part induces a flow variation, a variation that can be detected by an electromagnetic type position sensor.

Therefore, such actuators are capable of providing a representative image of the position of the load energized directly or, more frequently, through a reducing gear, thanks to a position control, therefore requiring an appropriate electronic control device and a position sensor for the mobile organ. This sensor is, in most cases, of the potentiometric, magnetic, or optic type, and it is mounted on the back of the actuator.

Naturally, this position sensor requires, for this reason, an extra space at the level of the actuator, not to mention that some of its constituent elements have to be extended in order to permit this detection of the rotation of the mobile organ. In this context, moreover, one has to make sure that the presence of these sensors does not influence the propagation of the magnetic flows between different the stator poles.

Furthermore, in such a construction, the electric connection of this or these sensors and that of the actuator to the electronic control card turns out to be relatively complex.

BRIEF SUMMARY OF THE INVENTION

Within the scope of a first inventive step, an attempt has been made to solve problems resulting from the externalization of the sensors, integrating them directly and ideally into the actuator, in particular in a same plane as the stator windings. In a second inventive step, one has tried to find a solution, not only capable of eliminating the above-mentioned constraints, but also not requiring any geometrical or generic modifications of the various elements which the actuator is comprised of, modifications that would be a handicap as regards costs of manufacturing and assembly, standardization and easy operation.

To this end, the invention relates to a polyphase motor consisting, on the one hand, of a fixed part or stator energized by electric coils and, on the other hand, a mobile part or rotor including N pairs of poles radially magnetized in alternate directions, N being not higher than or equal to 4 while being other than a multiple of 3, and said stator having P×9 identical poles spaced apart by 40°/P, said stator poles being assembled consecutively three by three so as to define a phase consisting of a W-shaped circuit, grouping three consecutive stator poles, the central stator pole bearing the winding of said phase.

According to the invention, it includes at least one element for detecting the position of the rotor arranged in a game stage as the stator poles, in a housing substantially equidistant between two consecutive stator poles not belonging to one and the game phase.

Advantageously, said housing is defined by said consecutive stator poles not belonging to one and the same phase.

According to another feature of the invention, said position-detection elements are Hall-effect probes.

According to another feature of the invention, said probes have analog outputs.

According to another feature of the invention, said probes have digital outputs.

According to another feature of the invention, the central stator poles bearing the winding of a phase are in the form of elements inserted at the level of the stator structure. Such a design has the advantage that the coils can be mounted on these central poles, not by a mere engagement, but by winding around the latter. Finally, this allows to increase the volume of copper, which results into generating more efficiency for the motor. Furthermore, it should be noted that this way of designing the stator structure of the motor also allows to increase the surface of these central poles in front of the rotor and, therefore, that of all stator poles.

This invention will be better understood when reading the following description accompanied by the attached drawings referring to embodiments given by way of examples.

DETAILED DESCRIPTION OF THE INVENTION

Figures 1, 2, 3, 4, 5, 6:
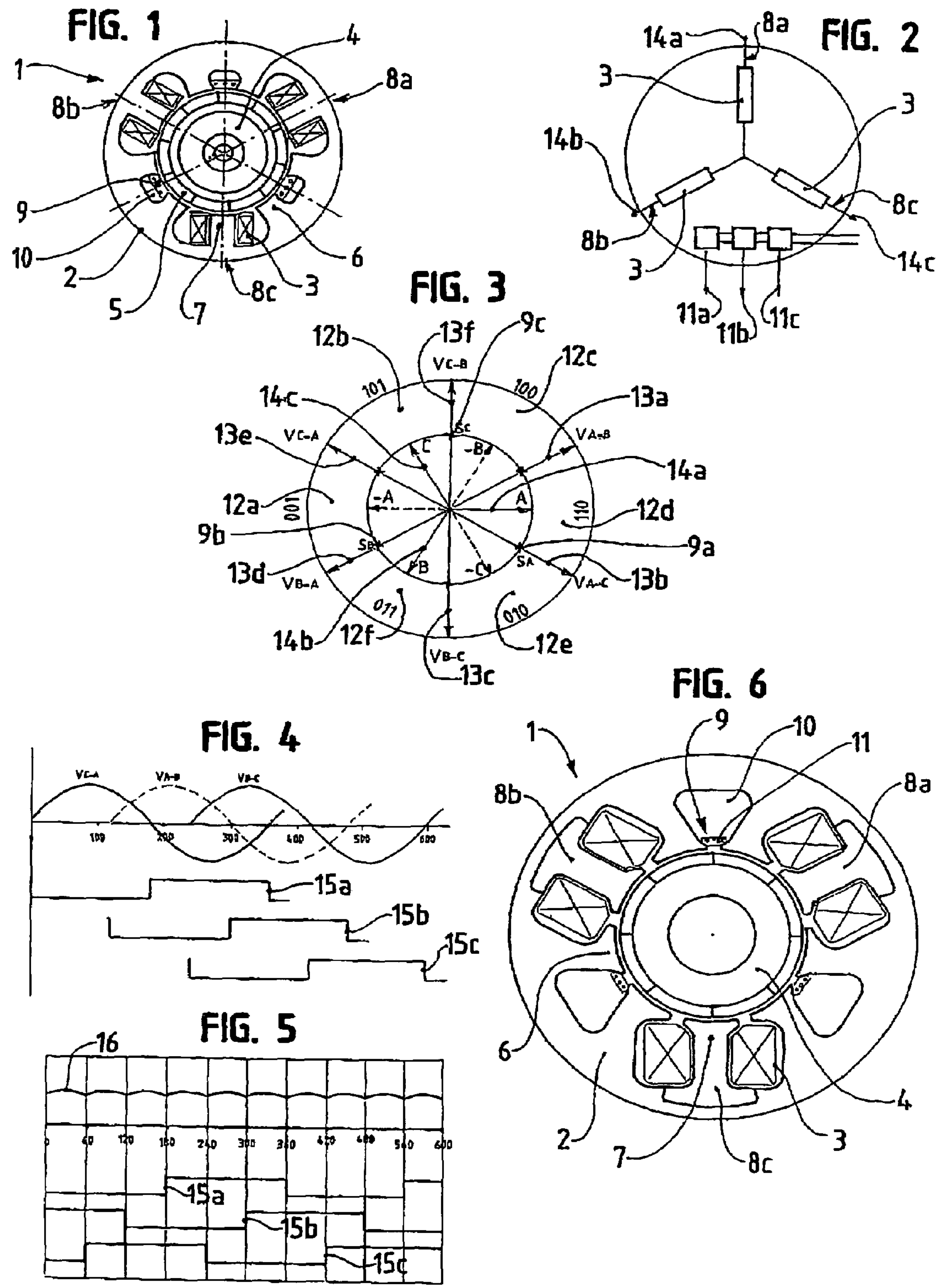
FIG. 1 corresponds to a cross-sectional view of a three-phase motor according to the invention, that is including in one and the same stage the three phases of the motor as well as one or more rotor-position detection elements.
FIG. 2 represents the electrical wiring diagram of the three phases of the motor and also of the three Hall probes.
FIG. 3 is a diagrammatic illustration of a vectorial representation of the three phases of the motor and the representation of the six angular sectors determined by the three position sensors.
FIG. 4 is a graph illustration that represents, depending on the position of the rotor, the pair obtained for three cases of supply of the windings, as well as the signals proceeding from the three probes.
FIG. 5 is another graph illustration that represents the torque obtained by maintaining the supply of the phases ensuring a maximum torque.
FIG. 6 is a cross-sectional view of the motor according to the invention in which the central pole of each W-shaped circuit is an inserted element.

FIG. 1 corresponds to a cross-sectional view of a three-phase motor 1 according to the invention. The structure of the motor 1 is a classical one, the latter including, on the one hand, a fixed part or stator 2, energized by electric coils 3 and, on the other hand, a magnetized mobile part or rotor 4.

Said rotor includes N pairs of rotor poles 5 radially magnetized in alternate directions, N being higher than or equal to 4 while being other than a multiple of 3. Within the scope of the embodiment corresponding to the figures of the attached drawing, N is equal to 5.

Said stator has P×9 poles 6 the pole shoes of which are identical and spaced apart by 40°/P, said stator poles 6 being assembled consecutively three by three so as to define a phase consisting of a W-shaped circuit, grouping three consecutive stator poles, the central stator pole 7 bearing the winding 3 of said phase B.

In the figures of the drawing is shown a motor 1 the stator 2 of which comprises nine identical poles 6, P being, in this case, equal to 1. Therefore, these stator poles 6 are spaced apart, in this case, by 40°. The pole shoes of the central poles 7 of two W-shaped circuits are angularly spaced apart by 120°.

Advantageously, this motor 1 includes at least one element for detecting the position 9 of the rotor 4 arranged in one and the same stage as the stator poles 6, in a housing 10 equidistant between two consecutive stator poles 6 not belonging to one and the same phase 8.

Preferably, it includes as many position-detection elements 9 as there are phases 8, one detection element 9 being positioned between each of these phases 8, in the conditions mentioned above.

In particular, between two consecutive stator poles 6 not belonging to one and the same phase is arranged a housing 10, preferably defined by these two poles 6, in for receiving such a detection element 9.

The latter, being of a number identical to that of the phases 8, allow, not only to control the position by counting the steps of the motor 1, but also to control the latter by in auto-switching mode.

In the conditions specified above, the position-detection elements 9 are angularly positioned in an optimal way for controlling the motor 1 in the auto-switching mode. Indeed, the magnetic fields generated by the electric coils 3 do not disturb these elements, which are therefore sensitive only to the fields due to the permanent magnets 5 of the rotor. In addition, being arranged in one and the same stage as said stator poles 6, the presence of these detection elements 9 does not have any harmful effect on the other constituent elements of the motor 1, in particular as regards the rotor 4, as has been explained with respect to the solutions used until now, within the scope of the presentation of the state of the art.

The position-detection elements 9 are, preferably, magnetic sensors and, more precisely, Hall-effect probes 11 particularly sensitive to magnetic-field variations.

The position-detection elements 9 can be of the digital or analog type. Digital ones allow the distinction of 6 angular sectors 12 inside each pair of poles 5 of the rotor. The analog ones provide sinusoid signals, also easy to be used.

FIG. 2 represents the electrical wiring diagram of the three phases 8 of the motor 1, designated by 8*a,* 8*b,* and 8*c,* respectively, as well as of the three Hall probes 11, designated by 11*a,* 11*b,* and 11*c,* respectively. The star connection of the windings 3 of the motor 1 requires three output wires for the supply of the phases 8.

There are always two windings 3 fed simultaneously, and a winding 3 in which no current is flowing.

The three Hall-effect probes 11 have a common supply and a common mass, therefore a classical connection, with five dedicated wires.

FIG. 3 is a vectorial representation of the 3 phases 8*a,* 8*b,* 8*c* of the motor, and the representation of the 6 angular sectors 12 determined by the 3 position-detection elements 9, and designated by 12*a,* 12*b,* 12*c,* 12*d,* 12*a,* and 12*f,* respectively in the anti-trigonomehric direction. The three phases 8*a,* 8*b,* and 8*c* are electrically shifted by 120°. By using a bipolar supply mode, one can obtain inside a pair of poles 6 stable positions, in this case represented by the vectors 13*a,* 13*b,* 13*c,* 13*d,* 13*e,* and 13*f.* For example, the vector 13*a* represents the stable position obtained by feeding the motor between the output wires 14*a* and 14*b,* the current flowing from 14*a* toward 14*b.*

The switching points of the position detectors 9 are graphically located on the same vectors.

FIG. 4 represents, depending on the position of the rotor 4, the pair 16 obtained for three cases of supply of the coils 3, as well as the signals 15 proceeding from the three probes 11.

FIG. 5 represents the torque 16 obtained by maintaining the supply of the phases 8 ensuring a maximum torque.

FIG. 6 is a cross-sectional view of the motor 1 according to the invention and in which the central pole 7 with its winding of each W-shaped circuit constitute a whole inserted at the level of the stator structure. This design allows to increase the volume of copper and to generate more efficiency for the motor 1.

I claim:

1. A multi-phase motor apparatus comprising:

a plurality of electrical coils;

a fixed stator energized by said plurality of electrical coils, said fixed stator having a central stator pole and a pair of lateral poles;

a mobile rotor positioned interior of said fixed stator, said mobile rotor having N pairs of poles radially magnetized in alternate directions, N being no less than 4 but not a multiple of 3, said fixed stator having P×9 identical radially extending poles spaced apart by 40°/P directed toward said mobile rotor, the poles of said fixed stator being positioned in a common plane, said poles of said fixed stator arranged consecutively three by three so as to define a phase, said phase being a W-shaped circuit that groups three consecutive adjacent poles of said fixed stator of said central stator pole and said pair of lateral poles, said pair of lateral poles being unwound, said central stator pole bearing a winding of said phase; and a position detecting means for detecting a position of said mobile rotor arranged in the common plane of said poles of said fixed stator and positioned exterior of said mobile rotor, said position detecting means received in a housing positioned equidistant between two consecutive lateral poles of said fixed stator which are not in the same phase, said position detecting means being positioned in a region free of magnetic flux generated by said plurality of electrical coils.

2. The apparatus of claim 1, said position detecting means comprising a plurality of position detecting elements of a number equal to a number of the phases.

3. The apparatus of claim 1, said housing defined by consecutive poles of said fixed stator not in the same phase.

4. The apparatus of claim 1, said position detecting means further comprising a means for controlling the motor in a auto-switching mode.

5. The apparatus of claim 1, each of said plurality of position-detecting elements being a Hall-effect probe.

6. The apparatus of claim 1, said Hall-effect probe having an analog output.

7. The apparatus of claim 1, said Hall-effect probe having a digital output.

* * * * *